United States Patent
Park

(10) Patent No.: US 12,337,837 B2
(45) Date of Patent: Jun. 24, 2025

(54) METHOD AND APPARATUS FOR PREVENTING CAR COLLISION

(71) Applicant: HYUNDAI MOBIS Co., Ltd., Seoul (KR)

(72) Inventor: Ge O Park, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 380 days.

(21) Appl. No.: 17/869,342

(22) Filed: Jul. 20, 2022

(65) Prior Publication Data

US 2023/0024074 A1 Jan. 26, 2023

(30) Foreign Application Priority Data

Jul. 21, 2021 (KR) .................. 10-2021-0095632

(51) Int. Cl.
| | |
|---|---|
| *B60W 30/095* | (2012.01) |
| *B60W 60/00* | (2020.01) |
| *B60W 30/08* | (2012.01) |
| *B60W 40/02* | (2006.01) |
| *B60W 40/105* | (2012.01) |
| *B60W 50/00* | (2006.01) |

(52) U.S. Cl.
CPC .... *B60W 30/0956* (2013.01); *B60W 60/0015* (2020.02); *B60W 2420/403* (2013.01); *B60W 2520/105* (2013.01); *B60W 2552/10* (2020.02); *B60W 2552/53* (2020.02); *B60W 2554/20* (2020.02); *B60W 2554/4041* (2020.02); *B60W 2554/4049* (2020.02)

(58) Field of Classification Search
None
See application file for complete search history.

(56) References Cited

U.S. PATENT DOCUMENTS

| | | | |
|---|---|---|---|
| 2013/0054106 A1* | 2/2013 | Schmudderich | G01S 13/931 701/1 |
| 2019/0329777 A1* | 10/2019 | Rajab | B60W 40/04 |
| 2020/0247417 A1* | 8/2020 | Kato | B60K 35/10 |
| 2021/0078570 A1* | 3/2021 | Shalev-Shwartz | G01S 17/86 |
| 2021/0269065 A1* | 9/2021 | Haggblade | B60W 30/18154 |
| 2021/0304607 A1* | 9/2021 | Grace | G08G 1/166 |
| 2021/0370921 A1* | 12/2021 | Silva | B60W 60/0027 |
| 2022/0332319 A1* | 10/2022 | Park | B60W 30/143 |
| 2022/0375349 A1* | 11/2022 | Xue | G08G 1/167 |

FOREIGN PATENT DOCUMENTS

JP 2004178239 A * 6/2004

* cited by examiner

*Primary Examiner* — Aniss Chad
*Assistant Examiner* — Madison R. Inserra
(74) *Attorney, Agent, or Firm* — Morgan, Lewis & Bockius LLP

(57) ABSTRACT

There is provided a method for preventing car collision, the method comprising: obtaining information about a vehicle stopped in front of a preceding vehicle acquired by the preceding vehicle; calculating a deceleration amount for preventing a collision with the stopped vehicle based on the information about the stopped vehicle; predicting a preset event related to the preceding vehicle based on a change in the position of the preceding vehicle; and controlling an autonomous driving vehicle based on the deceleration amount according to a prediction result.

16 Claims, 8 Drawing Sheets

METHOD AND APPARATUS FOR PREVENTING CAR COLLISION

CROSS-REFERENCE TO RELATED APPLICATIONS

This application claims priority to Patent Application No. 10-2021-0095632, filed on Jul. 21, 2021 in Korea, the entire contents of which are incorporated herein by reference.

TECHNICAL FIELD

The present disclosure relates to a method and apparatus for preventing car collision with a preceding vehicle during driving of an autonomous driving vehicle.

BACKGROUND

The statements in this section merely provide background information related to the present disclosure and do not necessarily constitute prior art.

Smart cruise control (SCC) is technology applied to autonomous driving vehicles which allows a vehicle to travel at a preset speed while maintaining a constant distance from a preceding vehicle. A SCC vehicle calculates a required speed thereof based on a distance from a preceding vehicle and a relative speed with respect to the preceding vehicle, measured by a sensor mounted in the vehicle. Based on the calculated required speed, the SCC vehicle performs acceleration or deceleration control by itself to travel while maintaining a preset inter-vehicle distance and speed.

An autonomous driving vehicle that is traveling using SCC travels based on driving information of a preceding vehicle. When a vehicle stops in front of the preceding vehicle, it is difficult for the autonomous driving vehicle to recognize that the vehicle stops in front of the preceding vehicle because the view of the autonomous driving vehicle is blocked by the preceding vehicle. If the preceding vehicle suddenly changes lanes to an adjacent lane while the autonomous driving vehicle is traveling while maintaining an inter-vehicle distance and speed based only on the driving information of the preceding vehicle, the autonomous driving vehicle recognizes that the vehicle has stopped in front of the preceding vehicle after the preceding vehicle changes lanes. Since the autonomous driving vehicle cannot recognize in advance that the vehicle stops in front of the preceding vehicle, there is a problem in that the risk of colliding with the vehicle that stops in front of the preceding vehicle increases.

SUMMARY

According to an embodiment, it is possible to obtain information about a vehicle stopped in front of a preceding vehicle of an autonomous driving vehicle and control the autonomous driving vehicle based on the information.

According to an embodiment, it is possible to obtain information about a vehicle stopped in front of a preceding vehicle of an autonomous driving vehicle, predict whether a lane change of the preceding vehicle occurs, and control the autonomous driving vehicle in advance based thereon to prevent a vehicle collision.

The problems to be solved by the present disclosure are not limited to the problems mentioned above, and other problems that are not mentioned will be clearly understood by those skilled in the art from the following description.

According to one embodiment of the present disclosure, there is provided an apparatus for preventing car collision, the apparatus comprising: a communication unit configured to communicate with a preceding vehicle or a camera; and a processor operatively connected to the communication unit, wherein the processor is configured to: obtain information about a vehicle stopped in front of the preceding vehicle acquired by the preceding vehicle; calculate a deceleration amount for preventing a collision with the stopped vehicle based on the information about the stopped vehicle; predict a preset event related to the preceding vehicle based on a change in the position of the preceding vehicle; and control an autonomous driving vehicle based on the deceleration amount according to a prediction result.

According to another embodiment of the present disclosure, there is provided a method for preventing car collision, the method comprising: obtaining information about a vehicle stopped in front of a preceding vehicle acquired by the preceding vehicle; calculating a deceleration amount for preventing a collision with the stopped vehicle based on the information about the stopped vehicle; predicting a preset event related to the preceding vehicle based on a change in the position of the preceding vehicle; and controlling an autonomous driving vehicle based on the deceleration amount according to a prediction result.

According to an embodiment of the present disclosure, the method and apparatus for preventing car collision can obtain information about a vehicle stopped in front of a preceding vehicle of an autonomous driving vehicle and control the autonomous driving vehicle based on the information.

According to an embodiment of the present disclosure, the method and apparatus for preventing car collision can obtain information about a vehicle stopped in front of a preceding vehicle of an autonomous driving vehicle, predict whether a lane change of the preceding vehicle occurs, and control the autonomous driving vehicle in advance based thereon to prevent a vehicle collision.

DETAILED DESCRIPTION

Figure 1:
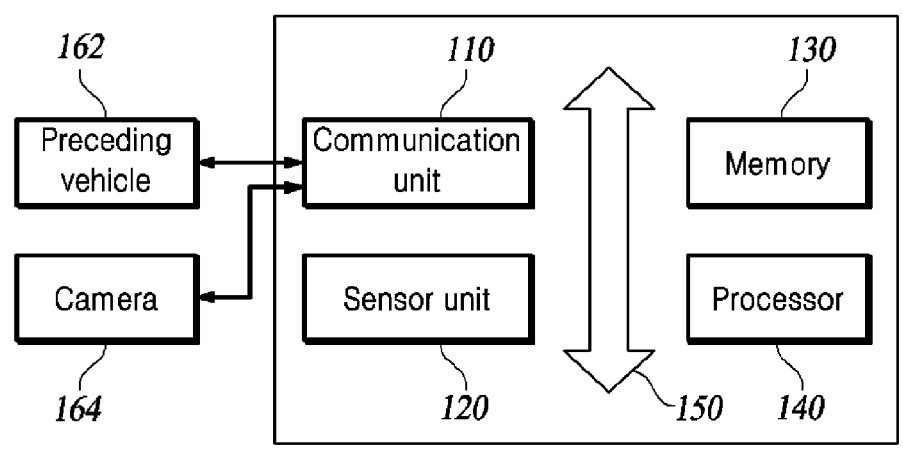
FIG. 1 is a block diagram of an apparatus for preventing car collision according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The description of the present disclosure set forth below in conjunction with the accompanying drawings is intended to describe exemplary embodiments of the present disclosure, and is not intended to represent the only embodiments in which the present disclosure may be practiced.

FIG. 1 is a block diagram of an apparatus for preventing car collision according to an embodiment of the present disclosure.

Referring to FIG. 1, the apparatus for preventing car collision 100 according to an embodiment includes a communication unit 110, a sensor unit 120, a memory 130, and a processor 140. Here, the communication unit 110, the sensor unit 120, the memory 130, and the processor 140 included in the apparatus for preventing car collision 100 may mutually transmit data through a bus 150.

According to an embodiment, the apparatus for preventing car collision 100 may be mounted on an autonomous driving vehicle. According to an embodiment, the apparatus for preventing car collision 100 may be mounted on a non-autonomous driving vehicle to prevent collision of the non-autonomous driving vehicle.

The apparatus for preventing car collision 100 includes the communication unit 110 connected to a preceding vehicle 162 and a camera 164. The communication unit 110 may be a hardware device implemented by various electronic circuits, e.g., processor, transceiver, etc., to exchange data with the preceding vehicle 162 and the camera 164 in a wireless manner. Here, as a wireless data communication method, various data communication methods such as Dedicated Short Range Communications (DSRC), Wireless Access in Vehicular Environments (WAVE), Wi-Fi®, and 5G can be used, but the present disclosure is not limited thereto.

The communication unit 110 may transmit/receive data to/from the preceding vehicle 162 within a preset distance (e.g., 200 m or the like) from the autonomous driving vehicle. Here, the preceding vehicle 162 is a vehicle that is traveling in front of the autonomous driving vehicle within a preset distance from the autonomous driving vehicle and is traveling using the same lane as the lane to which the autonomous driving vehicle belongs. The preceding vehicle 162 is a vehicle capable of performing vehicle-to-vehicle (hereinafter, "V2V") communication with the autonomous driving vehicle. As a communication method used for V2V communication, various wireless communication methods such as DSRC, WAVE, Wi-Fi®, and 5G can be used, but the present disclosure is not limited thereto.

The apparatus for preventing car collision 100 receives information about a vehicle stopped in front of the preceding vehicle 162, for example, a vehicle stopped in front of the lane in which the preceding vehicle is traveling, from the preceding vehicle 162 through the communication unit 110. Here, the information about the vehicle stopped in front of the preceding vehicle is information sensed by at least one sensor provided in the preceding vehicle 162. The at least one sensor provided in the preceding vehicle 162 may include at least one of radio detection and ranging (RADAR), a camera, an image sensor, light detection and ranging (LiDAR), and an ultrasonic sensor.

The information about the vehicle stopped in front of the preceding vehicle 162 may include at least one of information about the distance between the preceding vehicle 162 and the vehicle stopped in front of the preceding vehicle 162 and information about the lane in which the vehicle stopped in front of the preceding vehicle 162 is located.

The communication unit 110 may transmit/receive data to/from the camera 164. Here, the camera 164 may be at least one camera installed on a road on which the autonomous driving vehicle is traveling. The camera 164 may be a plurality of closed-circuit TVs (hereinafter "CCTVs") installed on the road on which the autonomous driving vehicle is traveling and may be at least one of a speed control CCTV, a traffic detection CCTV, and a crime prevention CCTV. The camera 164 may be a device constituting an intelligent transport system (hereinafter, "ITS").

The camera 164 detects real-time information about a vehicle stopped in front of the preceding vehicle 162 of the autonomous driving vehicle on the road on which the autonomous driving vehicle is traveling and transmits the real-time information to the autonomous driving vehicle. The camera 164 may include a wireless data communication device to transmit information about a vehicle stopped in front to the autonomous driving vehicle.

The apparatus for preventing car collision 100 receives information about a vehicle stopped in front of the preceding vehicle 162 from the at least one camera 164 installed on the road on which the autonomous driving vehicle is traveling through the communication unit 110. Here, the information about the vehicle stopped in front of the preceding vehicle 162 may include at least one of information about the distance between the preceding vehicle 162 and the vehicle stopped in front of the preceding vehicle 162 and information about the lane in which the vehicle stopped in front of the preceding vehicle 162 is located.

The apparatus for preventing car collision 100 includes the sensor unit 120 that detects a change in the position of the preceding vehicle 162 of the autonomous driving vehicle.

The sensor unit 120 includes a plurality of sensors installed at predetermined positions of the autonomous vehicle. The plurality of sensors installed at predetermined positions may be a plurality of front sensors installed in the autonomous vehicle to detect the preceding vehicle 162. The front sensor may include at least one of at least one of radio detection and ranging (RADAR), a camera, an image sensor, light detection and ranging (LiDAR), and an ultrasonic sensor. The sensor unit 120 is not particularly limited as long as it is capable of detecting the preceding vehicle 162, the vehicle stopped in front of the preceding vehicle 162 and the lane.

The sensor unit 120 detects the preceding vehicle 162 and generates detection data.

The detection data of the preceding vehicle 162 includes information about driving of the preceding vehicle 162 that is traveling in front of the autonomous driving vehicle. The information about driving of the preceding vehicle 162 may include at least one piece of information among information about the traveling speed of the preceding vehicle 162, information about the lane in which the preceding vehicle 162 is traveling, and information about the distance between the autonomous driving vehicle and the preceding vehicle 162.

The apparatus for preventing car collision 100 includes the memory 130 capable of storing a program for processing or control of the processor 140 and various types of data for the operation of the vehicle collision avoidance apparatus 100.

The memory 130 may store the detection data generated by the sensor unit 120 detecting the preceding vehicle 162. Here, the detection data may be data including information on a change in the position of the preceding vehicle 162 over time.

In terms of hardware, the memory 130 may be various storage devices such as a ROM, a RAM, an EPROM, a flash drive, and a hard drive.

The apparatus for preventing car collision 100 includes the processor 140 that obtains information about a vehicle stopped in front of the preceding vehicle 162, calculates a deceleration amount for preventing a collision with the vehicle stopped in front of the preceding vehicle 162 based on the obtained information, predicts a preset event related to the preceding vehicle 162 based on a change in the position of the preceding vehicle 162, and controls the autonomous driving vehicle based on the calculated deceleration amount according to the prediction result.

The processor 140 obtains the information about the vehicle stopped in front of the preceding vehicle 162 through the communication unit 110. Here, the information about the vehicle is information detected by the preceding vehicle 162 using sensors.

When the processor 140 cannot obtain the information about the vehicle stopped in front of the preceding vehicle 162 from the preceding vehicle 162, the processor 140 obtains information about the vehicle stopped in front of the preceding vehicle 162, detected by one or more cameras 164 installed on the road on which the autonomous driving vehicle is traveling, through the communication unit 110.

The processor 140 calculates a deceleration amount for preventing a collision with the vehicle stopped in front of the preceding vehicle 162 based on the information about the vehicle stopped in front of the preceding vehicle 162.

The processor 140 obtains information about the distance between the preceding vehicle 162 and the vehicle stopped in front of the preceding vehicle 162 from the information about the vehicle stopped in front of the preceding vehicle 162, and based on this information, calculates the distance between the autonomous driving vehicle and the vehicle stopped in front of the preceding vehicle 162. The processor 140 calculates the deceleration amount based on the calculated distance between the autonomous driving vehicle and the vehicle stopped in front of the preceding vehicle 162 and the current speed of the autonomous driving vehicle. Here, the deceleration amount is an amount of deceleration from the current speed in order to reach a safe speed, which is a speed at which the autonomous driving vehicle can stop without colliding with a stopped vehicle when the autonomous driving vehicle brakes abruptly. Here, the safe speed may be a traveling speed of the autonomous driving vehicle at which the braking distance of the autonomous driving vehicle can be shorter than a distance between a position of the autonomous driving vehicle at the time when braking is started and the position of a stopped vehicle. The deceleration amount may be a difference between the current speed of the autonomous driving vehicle and a calculated safe speed. The deceleration amount may vary depending on the distance between the position of the autonomous driving vehicle and the vehicle stopped in front of the preceding vehicle 162.

The processor 140 may determine whether the preset event related to the preceding vehicle 162 occurs based on the detection data generated by the sensor unit 120 detecting the preceding vehicle 162.

The detection data generated by the sensor unit 120 detecting the preceding vehicle 162 includes information regarding a change in the position of the preceding vehicle 162. The processor 140 determines whether the preset event related to the preceding vehicle 162 occurs based on the information regarding a change in the position of the preceding vehicle 162.

The processor 140 determines whether the preset event related to the preceding vehicle 162 occurs when the preceding vehicle 162 moves from the lane in which the preceding vehicle 162 is traveling to an adjacent lane for a lane change. The processor 140 determines whether the preset event related to the preceding vehicle 162 occurs based on a change in the position of one side of the preceding vehicle on the side of the adjacent lane on the basis of the position of the adjacent lane in the direction in which the preceding vehicle 162 moves. The processor 140 determines a point in time at which one side of the preceding vehicle 162 is located at a point in an adjacent lane, separated by a distance exceeding $\frac{1}{3}$ of the full width of the preceding vehicle 162 from any one lane marking of the lane in which the preceding vehicle is traveling, as a point in time at which the preset event related to the preceding vehicle 162 occurs.

The processor 140 predicts whether the preset event related to the preceding vehicle 162 occurs using a trained event prediction model.

The processor 140 trains an event prediction model based on the detection data generated by the sensor unit 120 detecting the preceding vehicle 162. The event prediction model may be trained using a machine learning algorithm. Here, the machine learning algorithm may be at least one of Gradient Descent, an artificial neural network, Naive Bayes Classifier (NBC), hidden Markov model (HMM), K-means clustering, k-nearest neighbors (k-NN), and support vector machine (SVM).

The event prediction model may be trained based on information related to a change in the position of the preceding vehicle 162 from a first point in time to a second point in time, detected by the plurality of front sensors included in the sensor unit 120. Here, the first point in time means a point in time at which the preceding vehicle 162 starts to move from the same lane as the lane in which the autonomous driving vehicle is traveling to an adjacent lane, and the second point in time means a point in time at which one side of the preceding vehicle 162 is located at a point in an adjacent lane, separated by a distance exceeding $\frac{1}{3}$ of the full width of the preceding vehicle 162 from any one lane marking of the lane in which the preceding vehicle is traveling, which is determined as a point in time at which the preset event related to the preceding vehicle 162 occurs.

The processor 140 trains the event prediction model based on information related to a change in the position of the preceding vehicle 162 over time, detected by the plurality of front sensors included in the sensor unit 120, from the first point in time to the second point in time. Here, the information related to a change in the position of the preceding vehicle 162 may include one or more of information about the type of the preceding vehicle 162, information about the full width size of the preceding vehicle 162, information about the positions of lane markings of the lane to which the preceding vehicle 162 belongs, information about the speed of the preceding vehicle 162, and information about the distance between the preceding vehicle 162 and the autonomous driving vehicle.

When new detection data detected by the sensor unit 120 detecting a new change in the position of the preceding vehicle 162 is input to the trained event prediction model, the event prediction model generates data regarding the probability of occurrence of the preset event. The processor 140 predicts occurrence of the preset event based on the data regarding the probability of occurrence of the preset event.

Upon predicting that the preset event will occur, the processor 140 controls the autonomous driving vehicle based on the calculated deceleration amount. Upon predicting that the preset event will occur, the processor 140 performs deceleration control for decreasing the current speed of the autonomous driving vehicle by the calculated deceleration amount.

The processor 140 performs deceleration control for the autonomous driving vehicle at a point in time at which the preset event is predicted to occur. Here, the point in time at which the processor 140 predicts that the preset event will occur is a point time prior to a point in time at which the sensor unit recognizes the vehicle stopped in front of the preceding vehicle 162 when the preceding vehicle 162 changes lanes. Since the processor 140 can perform calculation of the deceleration amount and deceleration control before the sensor unit 120 recognizes the vehicle stopped in front of the preceding vehicle 162, the processor 140 can sufficiently cope with a sudden lane change of the preceding vehicle 162 and control the autonomous driving vehicle, as compared to a case in which the vehicle stopped in front of the preceding vehicle is detected, the deceleration amount is calculated, and then deceleration control is performed at the time when the sensor unit 120 recognizes the vehicle stopped in front of the preceding vehicle 162.

Figure 2A:
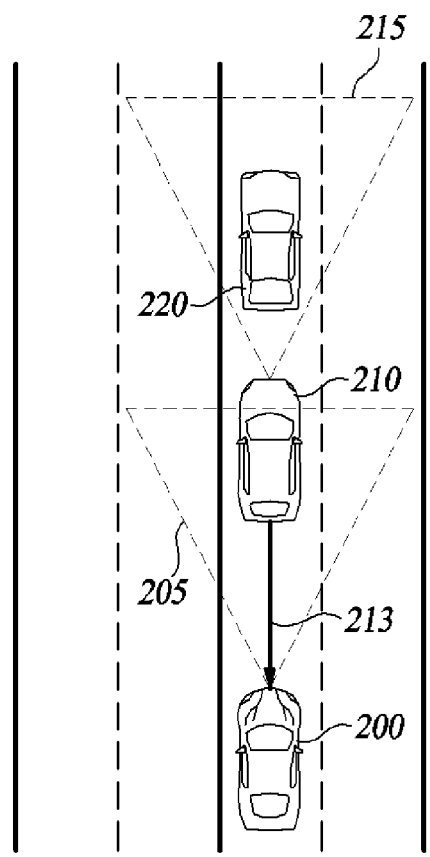
FIGS. 2A, 2B and 2C are views illustrating a process of controlling an autonomous driving vehicle equipped with the apparatus for preventing car collision based on information from a preceding vehicle according to an embodiment of the present disclosure.
Figure 2B:
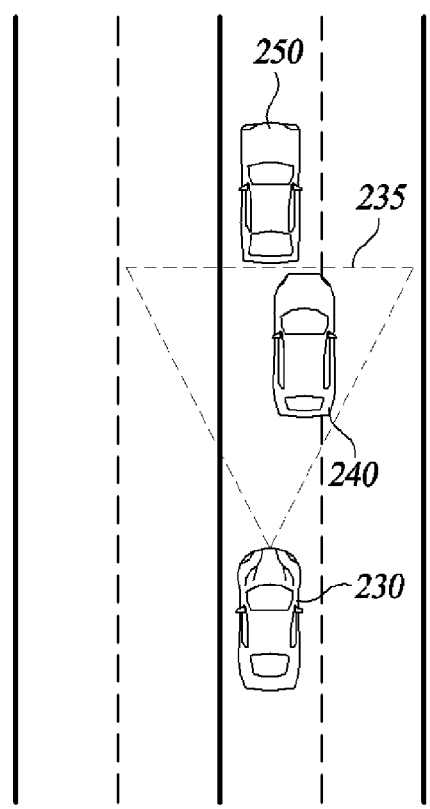
Figure 2C:
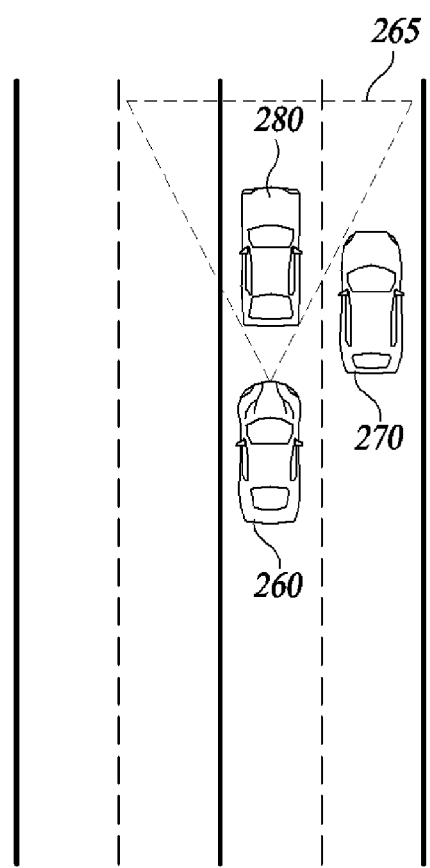

FIGS. 2A, 2B and 2C are views illustrating a process of controlling an autonomous driving vehicle equipped with the apparatus for preventing car collision based on information from a preceding vehicle according to an embodiment of the present disclosure.

FIG. 2A is a view illustrating a process in which an autonomous driving vehicle 200 obtains information about a vehicle 220 stopped in front of a preceding vehicle 210 from the preceding vehicle 210.

FIG. 2B is a view illustrating a process in which an autonomous vehicle 230 detects a change in the position of a preceding vehicle 240 and predicts a preset event related to the preceding vehicle 240.

FIG. 2C is a view illustrating a process of controlling an autonomous driving vehicle 260 to prevent a collision with a vehicle 280 stopped in front of a preceding vehicle 270.

Referring to FIG. 2A, the autonomous driving vehicle 200 is traveling in the same lane as the lane in which the preceding vehicle 210 is traveling. The preceding vehicle 210 is a vehicle that is traveling within a detection range 205 of a front sensor of the autonomous driving vehicle 200. The autonomous driving vehicle 200 may be traveling in a smart cruise control (SSC) mode in which it travels at a preset speed while maintaining a preset distance from the preceding vehicle 210. The autonomous driving vehicle 200 travels based on a distance from the preceding vehicle 210 and a relative speed of the preceding vehicle 210, detected by the front sensor of the autonomous driving vehicle 200.

When there is the vehicle 220 stopped in front of the preceding vehicle 210, the preceding vehicle 210 detects the vehicle 220 stopped within a detection range 215 of a front sensor provided in the preceding vehicle 210. The preceding vehicle 210 transmits information about the stopped vehicle 220 to the autonomous driving vehicle 200 (213). Here, the information about the vehicle 220 stopped in front of the preceding vehicle 210, transmitted by the preceding vehicle 210, includes at least one piece of information about the distance between the preceding vehicle 210 and the vehicle 220 stopped in front of the preceding vehicle 210 and information about the lane in which the vehicle 220 stopped in front of the preceding vehicle 210 is located.

Referring to FIG. 2B, the preceding vehicle 240 starts to change lanes to the adjacent lane on the right. The position of the preceding vehicle 240 is gradually changed to the right based on the right lane marking of the lane in which the preceding vehicle 240 is traveling.

The autonomous driving vehicle 230 continuously detects changes in the position of the preceding vehicle 240 within the detection range 235 of the front sensor using the front sensor. The autonomous driving vehicle 230 determines whether a preset event related to the preceding vehicle 240 occurs. Here, the autonomous driving vehicle 230 may determine that the preset event related to the preceding vehicle 240 occurs at a point in time at which the right side of the preceding vehicle 240 is located at a point on the right adjacent lane separated by a distance exceeding ⅓ of the full width of the preceding vehicle 240 from the position of the right lane marking of the lane in which the preceding vehicle 240 is traveling.

The autonomous driving vehicle 230 may predict whether the preset event related to the preceding vehicle 240 will occur. The autonomous driving vehicle 230 may predict whether the preset event related to the preceding vehicle 240 will occur based on detection data obtained by detecting a change in the position of the preceding vehicle 240 using a trained event prediction model.

Upon determining that the preset event related to the preceding vehicle 240 has occurred, the autonomous driving vehicle 230 determines that the preceding vehicle 240 has changed lanes to the right lane and calculates a deceleration amount based on a vehicle 250 stopped in front of the preceding vehicle 240.

The autonomous driving vehicle 230 decreases the current speed thereof to a speed at which a collision with the vehicle 250 stopped in front of the preceding vehicle 240 can be prevented based on the calculated deceleration amount. Here, the deceleration amount is a value calculated based on information about the vehicle 250 stopped in front of the preceding vehicle 240, transmitted from the preceding vehicle 240. If the autonomous driving vehicle 230 is traveling in the smart cruise control mode in which it travels at a preset speed, the preset speed may be reset to a decreased speed at which a collision with the vehicle 250 stopped in front of the preceding vehicle 240 can be prevented based on the calculated deceleration amount.

Referring to FIG. 2C, a preceding vehicle 270 has changed lanes to the right lane and travels outside a detection range 265 of a front sensor of an autonomous driving vehicle 260.

The autonomous driving vehicle 260 is traveling at a speed decreased in advance such that a collision with a vehicle 280 stopped in front of the preceding vehicle 270 can be prevented.

Upon detection of the vehicle 280 stopped in front within the detection range 265 of the front sensor of the autonomous driving vehicle 260, the autonomous driving vehicle 260 starts vehicle control based on the vehicle 280 stopped in front thereof. If the autonomous driving vehicle 260 is traveling the smart cruise control mode, the autonomous driving vehicle 260 is controlled to travel at a preset speed while maintaining a preset distance based on the vehicle 280 stopped in front thereof. Since the autonomous driving vehicle 260 is traveling at a speed decreased in advance such that a collision with the vehicle 280 stopped in front thereof can be prevented, the autonomous driving vehicle 260 can autonomously travel without the risk of a vehicle collision with the vehicle 280 stopped in front.

Figure 3A:
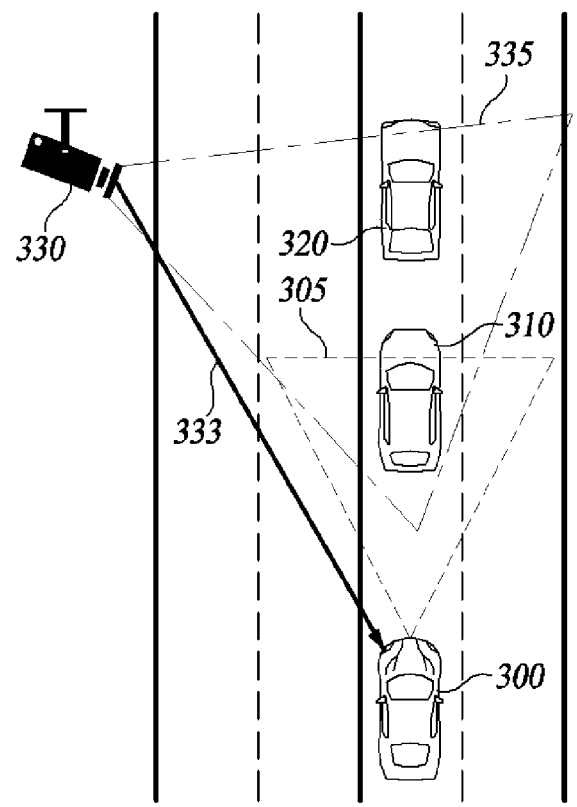
FIGS. 3A, 3B and 3C are views illustrating a process of controlling an autonomous driving vehicle equipped with the apparatus for preventing car collision based on information obtained from one or more cameras installed on a road on which the autonomous driving vehicle is traveling according to another embodiment of the present disclosure.
Figure 3B:
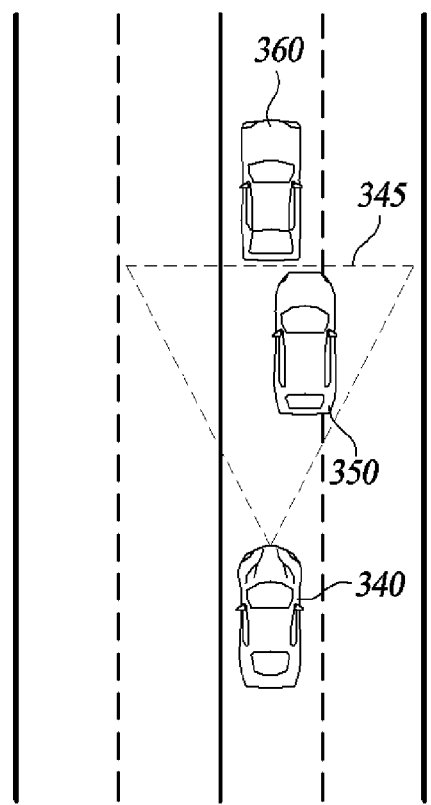
Figure 3C:
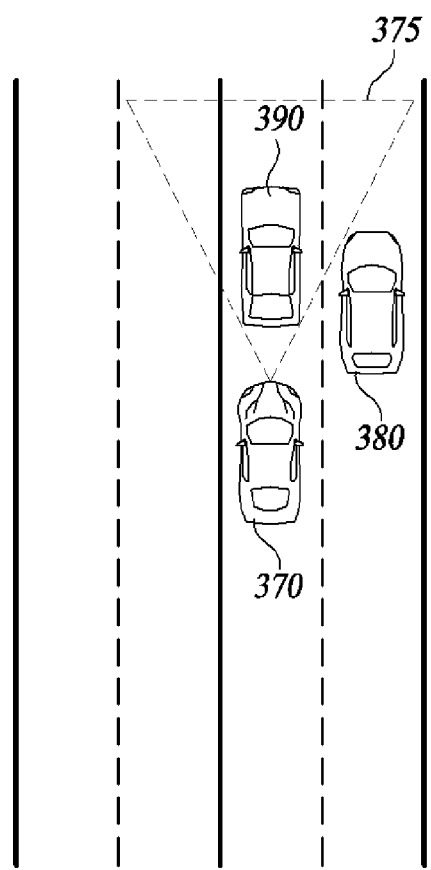

FIGS. 3A, 3B and 3C are views illustrating a process of controlling an autonomous driving vehicle equipped with the apparatus for preventing car collision based on information obtained from one or more cameras installed on a road on which the autonomous driving vehicle is traveling according to another embodiment of the present disclosure.

FIG. 3A is a view illustrating a process in which an autonomous driving vehicle 300 acquires information about a vehicle 320 stopped in front of a preceding vehicle 310 from a camera 330.

FIG. 3B is a view illustrating a process in which an autonomous driving vehicle 340 detects a change in the position of a preceding vehicle 350 and predicts a preset event related to the preceding vehicle 350.

FIG. 3C is a view illustrating a process of controlling an autonomous driving vehicle 370 to prevent a collision with a vehicle 390 stopped in front of a preceding vehicle 380.

Referring to (a) of FIG. 3, the autonomous driving vehicle 300 and the preceding vehicle 310 are traveling in the same lane. The preceding vehicle 310 is a vehicle that is traveling within a detection range 305 of a front sensor of the autonomous driving vehicle 300. The autonomous driving vehicle 300 may be traveling in the SSC mode in which it travels at a preset speed while maintaining a preset distance from the preceding vehicle 310. The autonomous driving vehicle 300 travels based on a distance from the preceding vehicle 310 and a relative speed of the preceding vehicle 310, detected by the front sensor of the autonomous driving vehicle 300.

When there is a vehicle 320 that is stopped in front of the preceding vehicle 310, one or more cameras 330 installed on the road on which the autonomous driving vehicle 300 is traveling detect the vehicle 320 stopped within the detection range 335 of the camera 330. The one or more cameras 330 installed on the road on which the autonomous driving vehicle is traveling transmit information about the stopped vehicle 320 to the autonomous driving vehicle 300 (333). Here, the information about the vehicle 320 stopped in front of the preceding vehicle 310, transmitted by the one or more cameras 330 installed on the road on which the autonomous driving vehicle 300 is traveling, includes at least one piece of information about the distance between the preceding vehicle 310 and the vehicle 320 stopped in front of the preceding vehicle 310 and information about the lane in which the vehicle 320 stopped in front of the preceding vehicle 310 is located.

Referring to FIG. 3B, a preceding vehicle 350 starts to change lanes to the adjacent lane on the right. The position of the preceding vehicle 350 is gradually changed to the right based on the right lane marking of the lane in which the preceding vehicle 350 is traveling.

An autonomous driving vehicle 340 continuously detects change in the position of the preceding vehicle 350 within a detection range 345 of a front sensor using the front sensor. The autonomous driving vehicle 340 determines whether a preset event related to the preceding vehicle 350 occurs. Here, it is possible to determine that the preset event related to the preceding vehicle 350 has occurred at a point in time at which the right side of the preceding vehicle 350 is located at a point in the right adjacent lane separated by a distance exceeding ⅓ of the full width of the preceding vehicle 350 from the position of the right lane marking of the lane in which the preceding vehicle 350 is traveling.

The autonomous driving vehicle 340 may predict whether the preset event related to the preceding vehicle 350 will occur. The autonomous driving vehicle 340 may predict whether the preset event related to the preceding vehicle 350 will occur based on detection data obtained by detecting a change in the position of the preceding vehicle 350 using a trained event prediction model.

Upon determining that the preset event related to the preceding vehicle 350 has occurred, the autonomous driving vehicle 340 determines that the preceding vehicle 350 has changed lanes to the right lane and calculates a deceleration amount based on the vehicle 360 stopped in front of the preceding vehicle 350.

The autonomous driving vehicle 340 decreases the current speed thereof to a speed at which a collision with the vehicle 360 stopped in front of the preceding vehicle 350 can be prevented based on the calculated deceleration amount. Here, the deceleration amount is a value calculated based on information about the vehicle 360 stopped in front of the preceding vehicle 350, transmitted from the preceding vehicle 350. When the autonomous driving vehicle 340 is traveling in the smart cruise control mode in which it travels at a preset speed, the preset speed may be reset to a speed at which a collision with the vehicle 360 stopped in front of the preceding vehicle 350 can be prevented based on the calculated deceleration amount.

Referring to FIG. 3C, a preceding vehicle 380 has changed lanes to the right lane and is traveling outside a detection range 375 of a front sensor of an autonomous driving vehicle 370.

The autonomous driving vehicle 370 is traveling at a speed decreased in advance at which a collision with a vehicle 390 stopped in front of the preceding vehicle 380 can be prevented.

Upon detection of the vehicle 390 stopped in front within the detection range 375 of the front sensor of the autonomous driving vehicle, the autonomous driving vehicle 370 starts vehicle control based on the vehicle 390 stopped in front. When the autonomous driving vehicle 370 is traveling in the smart cruise control mode, the autonomous driving vehicle 370 is controlled to travel at a preset speed while maintaining a preset distance based on the vehicle 390 stopped in front. Since the autonomous driving vehicle 370 is traveling at a speed decreased in advance at which a collision with the vehicle 390 can be prevented, the autonomous driving vehicle can autonomously travel without the risk of a vehicle collision with the vehicle 390 stopped in front.

Figure 4:
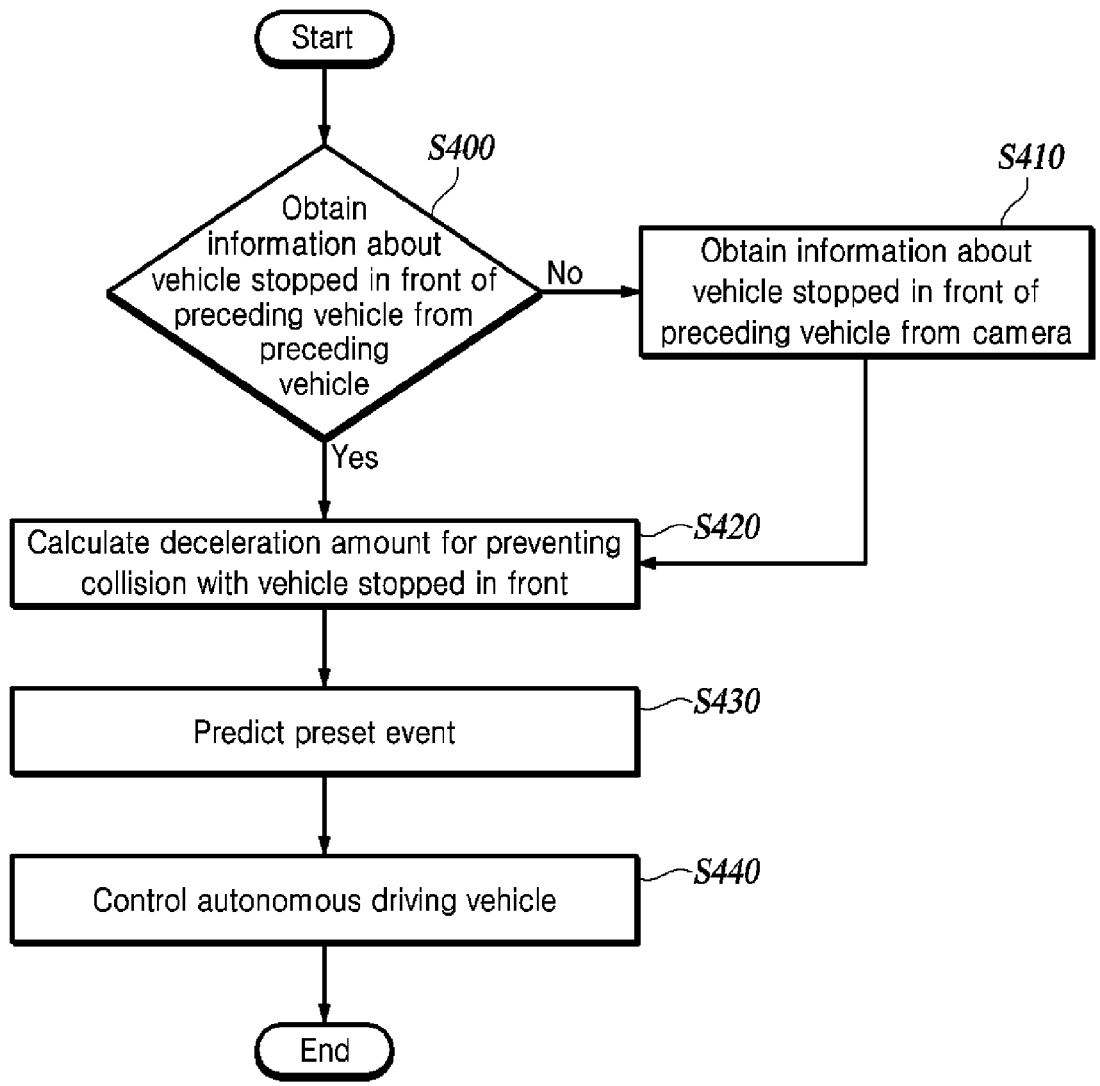
FIG. 4 is a flowchart illustrating a procedure of a method for preventing car collision according to an embodiment of the present disclosure.

FIG. 4 is a flowchart illustrating a procedure of a method for preventing car collision according to an embodiment of the present disclosure.

Referring to FIG. 4, the apparatus for preventing car collision obtains information about a vehicle stopped in front from a preceding vehicle (S400).

The preceding vehicle is a vehicle that is traveling within a preset distance in front of the autonomous driving vehicle equipped with the apparatus for preventing car collision using a lane in which the autonomous driving vehicle is traveling. The apparatus for preventing car collision can transmit/receive data to/from the autonomous driving vehicle using V2V communication. Here, as a communication method used for V2V communication, various wireless communication methods such as DSRC, WAVE, Wi-Fi®, and 5G can be used, but the present disclosure is not limited thereto.

The apparatus for preventing car collision receives information about a vehicle stopped in front of the preceding vehicle from the preceding vehicle. Here, the information about the vehicle stopped in front of the preceding vehicle is obtained using at least one of a radar, a camera, an image sensor, a lidar, and an ultrasonic sensor provided in the preceding vehicle. The apparatus for preventing car collision may obtain, from the preceding vehicle, at least one piece of information about the distance between the preceding vehicle and the vehicle stopped in front of the preceding vehicle and information about the lane in which the vehicle stopped in front of the preceding vehicle is located.

When apparatus for preventing car collision cannot obtain information about the vehicle stopped in front of the preceding vehicle from the preceding vehicle, the vehicle collision avoidance apparatus obtains information about the vehicle stopped in front of the preceding vehicle from a camera (S410).

The apparatus for preventing car collision may transmit/receive data to/from the camera. Here, the camera is at least one camera installed on the road on which the autonomous driving vehicle is traveling. Here, the camera may be a plurality of CCTVs and may be at least one of a speed control CCTV, a traffic detection CCTV, and a crime prevention CCTV.

The apparatus for preventing car collision receives information about the vehicle stopped in front of the preceding vehicle from at least one camera installed on the road on which the autonomous driving vehicle is traveling. Here, the information about the vehicle stopped in front of the preceding vehicle may include at least one piece of information about the distance between the preceding vehicle and the vehicle stopped in front of the preceding vehicle and information about the lane in which the vehicle stopped in front of the preceding vehicle is located. The information about the vehicle stopped in front of the preceding vehicle is information detected in real time by the at least one camera installed on the road on which the autonomous driving vehicle is traveling and transmitted to the autonomous driving vehicle.

The apparatus for preventing car collision calculates a deceleration amount for preventing a collision with the vehicle stopped in front (S420).

The apparatus for preventing car collision calculates the distance between the autonomous driving vehicle and the vehicle stopped in front of the preceding vehicle based on the information about the vehicle stopped in front of the preceding vehicle, and calculates a deceleration amount based on the calculated distance and the current speed of the autonomous driving vehicle. The autonomous driving vehicle may calculate a traveling speed thereof at which the braking distance of the autonomous driving vehicle is shorter than a distance from the position of the autonomous driving vehicle at the time when braking is started to the position of the stopped vehicle, and calculate a difference between the calculated traveling speed of the autonomous driving vehicle and the current speed of the autonomous driving vehicle as a deceleration amount.

The apparatus for preventing car collision calculates a deceleration amount for preventing a collision with the vehicle stopped in front of the preceding vehicle based on the information about the vehicle stopped in front, obtained from the preceding vehicle or the at least one camera installed on the road on which the autonomous driving vehicle is traveling.

The apparatus for preventing car collision predicts a preset event related to the preceding vehicle (S430).

The apparatus for preventing car collision detects a change in the position of the preceding vehicle using a front sensor and determines a point in time at which one side of the preceding vehicle is located at a point in an adjacent lane, separated by a distance exceeding ⅓ of the full width of the preceding vehicle from one lane marking of the lane in which the preceding vehicle is traveling, as a point in time at which the preset event related to the preceding vehicle occurs.

The apparatus for preventing car collision may predict whether the preset event related to the preceding vehicle will occur based on detection data obtained by detecting a change in the position of the preceding vehicle using a trained event prediction model.

The event prediction model of the apparatus for preventing car collision is trained based on detection data generated by the sensor unit detecting the preceding vehicle. The event prediction model may be trained using a machine learning algorithm. Here, the machine learning algorithm may be least one of gradient descent, an artificial neural network, Naive Bayes classifier (NBC), hidden Markov model (HMM), K-means clustering, k-nearest neighbors (k-NN), and support vector machine (SVM).

The event prediction model is trained based on information related to a change in the position of the preceding vehicle over time for a preset time period. Here, the preset time period is a period from when the preceding vehicle starts to move from the same lane as the traveling lane of the autonomous driving vehicle to an adjacent lane to when one side of the preceding vehicle is located at a point in the adjacent lane, separated by a distance exceeding ⅓ of the full width of the preceding vehicle from any one lane marking of the lane in which the preceding vehicle is traveling. The information related to a change in the position of the preceding vehicle over time may include at least one piece of information on the type of the preceding vehicle, information on the full width of the preceding vehicle, information on positions of lane markings of lanes, information on the speed of the preceding vehicle, and information on the distance between the preceding vehicle and the autonomous driving vehicle.

Upon acquisition of information on a new change in the position of the preceding vehicle, the apparatus for preventing car collision predicts occurrence of a preset event using the trained event prediction model.

The apparatus for preventing car collision controls the autonomous driving vehicle (S440).

When the apparatus for preventing car collision predicts that the preset event will occur, the apparatus for preventing car collision performs deceleration control for decreasing the current speed of the autonomous driving vehicle by the deceleration amount calculated based on the vehicle stopped in front of the preceding vehicle.

If the autonomous driving vehicle is traveling in the smart cruise control mode in which it travels at a preset speed, the preset speed is reset to a reduced speed at which a collision with the vehicle stopped in front of the preceding vehicle can be prevented based on the calculated deceleration amount. The autonomous driving vehicle that is traveling in the smart cruise control mode can continuously travel in the smart cruise control mode when the front sensor of the autonomous driving vehicle detects the vehicle stopped in front of the preceding vehicle after the preceding vehicle has changed lanes.

Although operations are illustrated in FIG. 4 in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in FIG. 4 can be changed and one or more operations of the operations can be performed in parallel. Thus, FIG. 4 is not limited to the temporal order.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Various implementations of the systems and techniques described herein may be implemented by a programmable computer. Here, a computer includes a programmable processor, a data storage system (which is a volatile memory, a non-volatile memory, or other types of storage systems or includes combinations thereof), and at least one communication interface. For example, a programmable computer may be one of a server, a network device, a set-top box, an embedded device, a computer expansion module, a personal computer, a laptop computer, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An apparatus for preventing car collision, the apparatus comprising:
   a communication unit configured to communicate with a preceding vehicle or a camera; and
   a processor operatively connected to the communication unit,
   wherein the processor is configured to:
   obtain information about a third vehicle in front of the preceding vehicle acquired by the preceding vehicle;
   calculate a deceleration amount for preventing a collision with the third vehicle based on the information about the third vehicle;
   predict a preset event related to the preceding vehicle based on a change in a position of the preceding vehicle; and
   control an autonomous driving vehicle based on the deceleration amount according to a prediction result regarding the preset event,
   wherein the processor detects the change in the position of the preceding vehicle and predicts occurrence of the preset event using an event prediction model based on the detected change in the position of the preceding vehicle,
   wherein the event prediction model is trained based on information related to the detected change in the position of the preceding vehicle using a machine learning algorithm,
   wherein the event prediction model is trained from a first point in time to a second point in time,
   wherein the first point in time is a point in time at which the preceding vehicle starts to move from a same lane as a lane in which the autonomous driving vehicle is traveling to an adjacent lane,
   wherein the second point in time is a point in time at which a portion of the preceding vehicle is located at a point in the adjacent lane, the point in the adjacent lane being separated by a predetermined distance from any one lane marking of the lane in which the preceding vehicle is traveling, and
   wherein the preset event related to the preceding vehicle is predicted to occur at the second point in time.

2. The apparatus of claim 1, wherein, when it is not possible to obtain, from the preceding vehicle, the information about the third vehicle in front of the preceding vehicle, the processor obtains the information about the third vehicle in front of the preceding vehicle detected by one or more cameras installed on a road on which the autonomous driving vehicle is traveling.

3. The apparatus of claim 2, wherein the information about the third vehicle in front of the preceding vehicle includes at least one piece of information among the group of information about a distance between the preceding vehicle and the third vehicle in front of the preceding vehicle and information about a lane in which the third vehicle in front of the preceding vehicle is located.

4. The apparatus of claim 1, wherein the preset event includes an event where one side of the preceding vehicle is positioned at a point in an adjacent lane of either side of a lane in which the preceding vehicle is traveling, the point being separated by a distance exceeding ⅓ of a total width of the preceding vehicle from any one lane marking of a corresponding side of the lane in which the preceding vehicle is traveling.

5. The apparatus of claim 1, wherein the information about the third vehicle in front of the preceding vehicle includes at least one piece of information among the group of information about a distance between the preceding vehicle and the third vehicle in front of the preceding vehicle and information about a lane in which the third vehicle in front of the preceding vehicle is located.

6. The apparatus of claim 1, wherein the third vehicle includes a vehicle that is stopped in front of the preceding vehicle.

7. The apparatus of claim 1, wherein the processor performs deceleration control of the autonomous driving vehicle based on the deceleration amount, at a point in time at which the processor determines that the preset event will occur based on the prediction result of the event prediction model, before a point in time at which the preset event actually occurs.

8. The apparatus of claim 1, wherein the processor predicts that the preset event will occur based on data regarding a probability of the occurrence of the preset event generated by the trained event prediction model.

9. A method for preventing car collision, the method comprising:
 obtaining information about a third vehicle in front of a preceding vehicle acquired by the preceding vehicle;
 calculating a deceleration amount for preventing a collision with the third vehicle based on the obtained information about the third vehicle;
 predicting a preset event related to the preceding vehicle based on a change in a position of the preceding vehicle; and
 controlling an autonomous driving vehicle based on the deceleration amount according to a prediction result regarding the preset event,
 wherein the predicting of the preset event related to the preceding vehicle comprises:
 detecting the change in the position of the preceding vehicle;
 training an event prediction model based on information related to the detected change in the position of the preceding vehicle using a machine learning algorithm; and
 predicting occurrence of the preset event using the event prediction model based on the change in the position of the preceding vehicle,
 wherein the training of the event prediction model comprises training the event prediction model from a first point in time to a second point in time,
 wherein the first point in time is a point in time at which the preceding vehicle starts to move from a same lane as a lane in which the autonomous driving vehicle is traveling to an adjacent lane,
 wherein the second point in time is a point in time at which a portion of the preceding vehicle is located at a point in the adjacent lane, the point in the adjacent lane being separated by a predetermined distance from any one lane marking of the lane in which the preceding vehicle is traveling, and
 wherein the preset event related to the preceding vehicle is predicted to occur at the second point in time.

10. The method of claim 9, further comprising obtaining the information about the third vehicle in front of the preceding vehicle detected by one or more cameras installed on a road on which the autonomous driving vehicle is traveling when it is not possible to obtain, from the preceding vehicle, the information about the third vehicle in front of the preceding vehicle.

11. The method of claim 10, wherein the information about the third vehicle in front of the preceding vehicle includes at least one piece of information among the group of information about a distance between the preceding vehicle and the third vehicle in front of the preceding vehicle and information about a lane in which the third vehicle in front of the preceding vehicle is located.

12. The method of claim 9, wherein the preset event includes an event where one side of the preceding vehicle is positioned at a point in an adjacent lane of either side of a lane in which the preceding vehicle is traveling, the point being separated by a distance exceeding ⅓ of a total width of the preceding vehicle from any one lane marking of a corresponding side of the lane in which the preceding vehicle is traveling.

13. The method of claim 9, wherein the information about the third vehicle in front of the preceding vehicle includes at least one piece of information among the group of information about a distance between the preceding vehicle and the third vehicle in front of the preceding vehicle and information about a lane in which the third vehicle in front of the preceding vehicle is located.

14. The method of claim 9, wherein the third vehicle includes a vehicle that is stopped in front of the preceding vehicle.

15. The method of claim 9, wherein the controlling of the autonomous driving vehicle comprises
 performing deceleration control of the autonomous driving vehicle based on the deceleration amount, at a point in time at which the processor determines that the preset event will occur based on the prediction result of the event prediction model, before a point in time at which the preset event actually occurs.

16. The method of claim 9, wherein the predicting of the preset event related to the preceding vehicle further comprises
 predicting that the preset event will occur based on data regarding a probability of the occurrence of the preset event generated by the trained event prediction model.

* * * * *